US008037283B2

United States Patent
Tsao et al.

(10) Patent No.: US 8,037,283 B2
(45) Date of Patent: Oct. 11, 2011

(54) MULTI-CORE STREAM PROCESSOR HAVING (N) PROCESSING UNITS AND (N+1) FETCHING UNITS

(75) Inventors: You-Ming Tsao, Taipei (TW); Liang-Gee Chen, Taipei (TW); Shao-Yi Chien, Taipei (TW)

(73) Assignee: National Taiwan University (TW)

( * ) Notice: Subject to any disclaimer, the term of this patent is extended or adjusted under 35 U.S.C. 154(b) by 287 days.

(21) Appl. No.: 12/435,935

(22) Filed: May 5, 2009

(65) Prior Publication Data

US 2010/0106941 A1 Apr. 29, 2010

(30) Foreign Application Priority Data

Oct. 24, 2008 (TW) .............................. 97140970 A

(51) Int. Cl.
*G06F 15/00* (2006.01)
*G06F 15/76* (2006.01)
(52) U.S. Cl. .......................... 712/10; 712/205; 712/206
(58) Field of Classification Search .................. None
See application file for complete search history.

(56) References Cited

U.S. PATENT DOCUMENTS

| 2005/0013705 A1* | 1/2005 | Farkas et al. .................. 417/393 |
| 2009/0174706 A1* | 7/2009 | Howson ........................ 345/419 |
| 2009/0300327 A1* | 12/2009 | Omtzigt ......................... 712/42 |

OTHER PUBLICATIONS

Khailany et al.; Imagine: Media Processing with Streams; 2001; IEEE.*
Benjamin et al.; Stream Processing on a Dual-Core Embedded System; 2007; SAMOS 2007, LNCS 4599, pp. 149-158.*
Zhou; Dual-Core Execution: Building a Highly Scalable Single-Thread Instruction Window; 2005; IEEE.*

* cited by examiner

*Primary Examiner* — Corey S Faherty
(74) *Attorney, Agent, or Firm* — Baker & McKenzie LLP

(57) ABSTRACT

In a multi-core stream processing system and scheduling method of the same, a scheduler is coupled to a number (N) of stream processing units and a number (N+1) of stream fetching units, where $N \geq 2$. When the scheduler receives a stream element from a $P^{th}$ stream fetching unit, the scheduler assigns a $P^{th}$ stream processing unit as a target stream processing unit when the $P^{th}$ stream processing unit does not encounter a bottleneck condition, assigns a $Q^{th}$ stream processing unit, which does not encounter the bottleneck condition, as the target stream processing unit when the $P^{th}$ stream processing unit encounters the bottleneck condition, where $1 \leq P \leq N$, $1 \leq Q \leq N$, and $P \neq Q$, and dispatches the received stream element to the target stream processing unit such that the target stream processing unit processes the stream element dispatched from the scheduler.

21 Claims, 5 Drawing Sheets

US 8,037,283 B2

MULTI-CORE STREAM PROCESSOR HAVING (N) PROCESSING UNITS AND (N+1) FETCHING UNITS

CROSS-REFERENCE TO RELATED APPLICATION

This application claims priority of Taiwanese Application No. 097140970, filed on Oct. 24, 2008.

BACKGROUND OF THE INVENTION

1. Field of the Invention

The invention relates to a scheduling method for a multi-core system, more particularly to a multi-core stream processing system and scheduling method for the same.

2. Description of the Related Art

In a conventional multi-core stream processing system, since workloads of respective stream processing units differ from each other, the utilization rate of each stream processing unit cannot be optimized, thereby adversely affecting system performance.

SUMMARY OF THE INVENTION

Therefore, an object of the present invention is to provide a multi-core stream processing system and scheduling method for the same that are capable of enhancing system performance.

According to one aspect of the present invention, a multi-core stream processing system comprises:

a number (N) of stream processing units, where $N \geq 2$;

a number (N+1) of stream fetching units, a first one of which is adapted to fetch a stream element from an external device; and a scheduler coupled to the stream processing units and the stream fetching units, and controlling second to $(N+1)^{th}$ ones of the stream fetching units so that each of the second to $(N+1)^{th}$ ones of the stream fetching units fetches a stream element from a source one of the stream processing units.

When the scheduler receives the stream element from a $P^{th}$ one of the stream fetching units, the scheduler determines whether a $P^{th}$ one of the stream processing units encounters a bottleneck condition, assigns the $P^{th}$ one of the stream processing units as a target one of the stream processing units when the $P^{th}$ one of the stream processing units does not encounter the bottleneck condition, finds a $Q^{th}$ one of the stream processing units that does not encounter the bottleneck condition, and assigns the $Q^{th}$ one of the stream processing units as the target one of the stream processing units when the $P^{th}$ one of the stream processing units encounters the bottleneck condition, where $1 \leq P \leq N$, $1 \leq Q \leq N$, and $P \neq Q$, and dispatches the stream element received thereby to the target one of the stream processing units such that the target one of the stream processing units processes the stream element dispatched from the scheduler.

According to another aspect of the present invention, there is provided a scheduling method for a multi-core stream processing system. The multi-core stream processing system includes a number (N) of stream processing units and a number (N+1) of stream fetching units, where $N \geq 2$. The scheduling method comprises the steps of:

a) receiving a stream element from a $P^{th}$ one of the stream fetching units, where $1 \leq P \leq N$;

b) determining whether a $P^{th}$ one of the stream processing units encounters a bottleneck condition;

c) assigning the $P^{th}$ one of the stream processing units as a target one of the stream processing units when it is determined in step b) that the $P^{th}$ one of the stream processing units does not encounter the bottleneck condition;

d) finding a $Q^{th}$ one of the stream processing units that does not encounter the bottleneck condition, and assigning the $Q^{th}$ one of the stream processing units as the target one of the stream processing units when it is determined in step b) that the $P^{th}$ one of the stream processing units encounters the bottleneck condition, where $1 \leq Q \leq N$ and $P \neq Q$; and e) dispatching the stream element received in step a) to the target one of the stream processing units for processing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
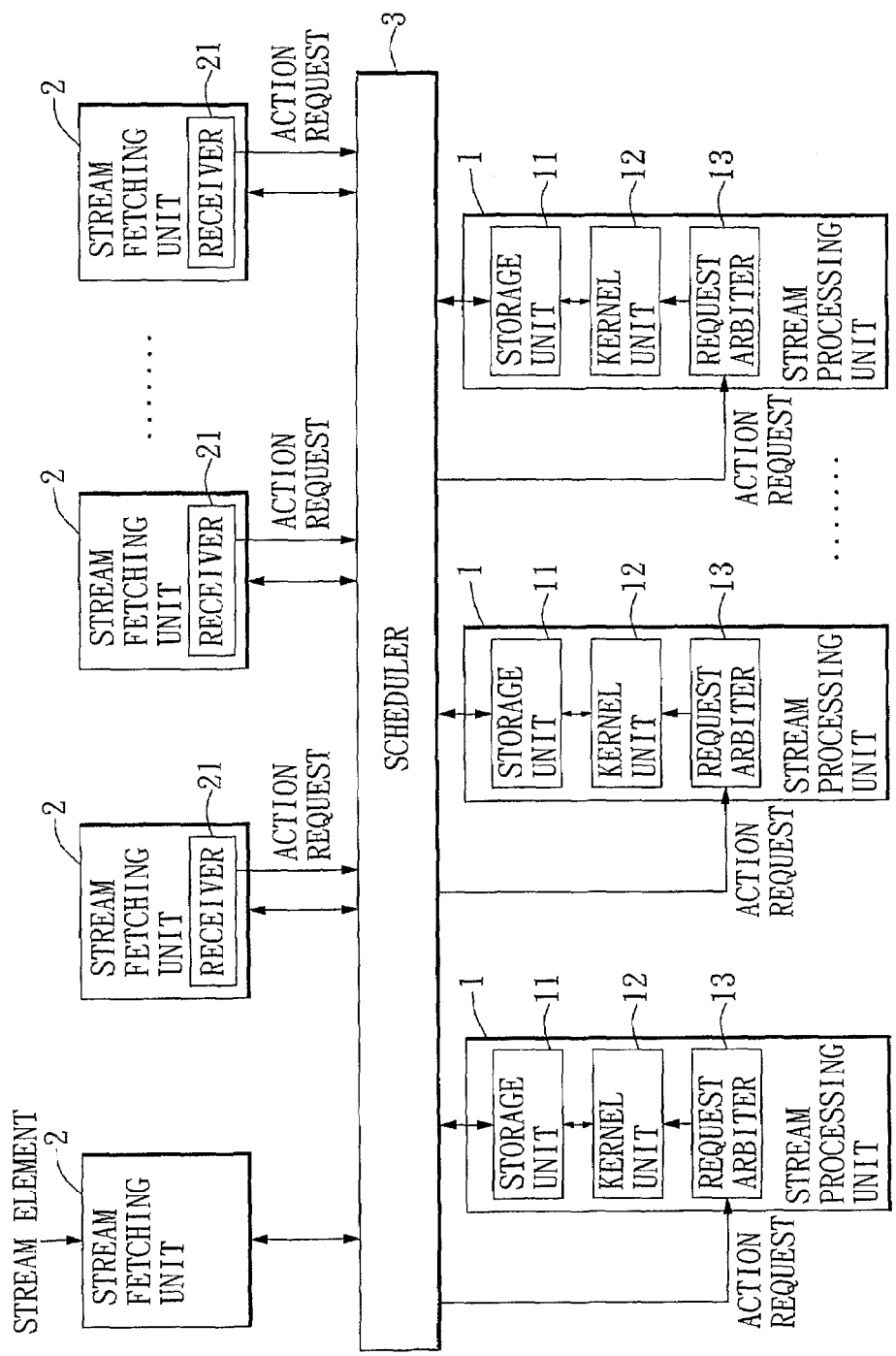
FIG. 1 is a schematic circuit block diagram illustrating the preferred embodiment of a multi-core stream processing system according to the present invention.

Referring to FIG. 1, the preferred embodiment of a multi-core stream processing system according to the present invention is shown to include a number (N) of stream processing units 1, a number (N+1) of stream fetching units 2, and a scheduler 3, where $N \geq 2$.

A first one of the stream fetching units 2 is adapted to fetch a stream element from an external device (not shown). In this embodiment, each of second to $(N+1)^{th}$ ones of the stream fetching units 2 includes a receiver 21.

In this embodiment, each of the stream processing units 1 includes a storage unit 11, a kernel unit 12 coupled to the storage unit 11, and a request arbiter 13 coupled to the kernel unit 12.

The scheduler 3 is coupled to the storage units 11 and the request arbiters 13 of the stream processing units 1, and to the stream fetching units 2. The scheduler 3 controls the second to $(N+1)^{th}$ ones of the stream fetching units 2 so that each of the second to $(N+1)^{th}$ ones of the stream fetching units 2 fetches a stream element from a source one of the stream processing units 1. It is noted that the stream element fetched by each stream fetching unit 2 includes stream data and a stream index.

When the scheduler 3 receives the stream element from a $P^{th}$ one of the stream fetching units 2, where $1 \leq P \leq N$, the scheduler 3 determines whether a $P^{th}$ one of the stream processing units 1 encounters a bottleneck condition. In this embodiment, the bottleneck condition for each stream processing unit 1 indicates that an amount of data stored in the storage unit 11 thereof is greater than a threshold amount. When the $P^{th}$ one of the stream processing units 1 does not encounter the bottleneck condition, the scheduler 3 assigns the $P^{th}$ one of the stream processing units 1 as a target one of the stream processing units 1. On the other hand, when the $P^{th}$ one of the stream processing unit 1 encounters the bottleneck condition, the scheduler 3 finds a $Q^{th}$ one of the stream processing units 1 that does not encounter the bottleneck condition, where $1 \leq Q \leq N$, and $P \neq Q$, and assigns the $Q^{th}$ one of the stream processing units 1 as the target one of the stream processing units 1. It is noted that, when P=1, the $Q^{th}$ one of the stream processing units 1 is in an idle state, where $2 \leq Q \leq N$. When $2 \leq P \leq N-1$, the $Q^{th}$ one of the stream processing units 1 is in a stall state, where $1 \leq Q \leq P-1$, and is in the idle state, where $P+1 \leq Q \leq N$, in case first to $(P-1)^{th}$ ones of the stream processing units 1 are not in the stall state. When P=N, the $Q^{th}$ one of the stream processing units 1 is in the stall state, where $1 \leq Q \leq N-1$. Thereafter, the scheduler 3 dispatches the stream element received thereby to the target one of the stream processing units 1, wherein the stream element dispatched from the scheduler 3 is stored in the storage unit 11 of the target one of the stream processing units 1, and outputs stream index information corresponding to the stream element received from the $P^{th}$ one of the stream fetching units 2 to a $(P+1)^{th}$ one of the stream fetching units 2, wherein the stream index information from the scheduler 3 is received by the receiver 21 of the $(P+1)^{th}$ one of the stream fetching units 2.

In this embodiment, the stream index information includes target information associated with the kernel unit 12 of the target one of the stream processing units 1, and the stream index of the stream element received by the scheduler 3 and associated with a starting storage address in the storage unit 11 of the target one of the stream processing units 1. The receiver 21 of the $(p+1)^{th}$ one of the stream fetching units 2 issues an action request corresponding to the stream index information received thereby to the target one of the stream processing units 1 through the scheduler 3 upon receipt of the stream index information from the scheduler 3.

In this embodiment, for each stream processing unit 1, the storage unit 11 stores at least one stream element dispatched from the scheduler 3. The request arbiter 13 receives at least one action request from the stream fetching units 2 through the scheduler 3, and stores the at least one action request. The kernel unit 12 is operable to process in sequence the at least one stream element stored in the storage unit 11, and updates the at least one stream element stored in the storage unit 11 with the at least one stream element processed thereby. It is noted that, for the target one of the stream processing units 1, the kernel unit 12 processes the at least one stream element stored in the storage unit 11 in response to the at least one action request received by the request arbiter 13.

In other embodiments, for the target one of the stream processing units 1, when the storage unit 11 is stored with a plurality of the stream elements and the request arbiter 13 is stored with a plurality of the action requests corresponding to the stream elements stored in the storage unit 11, the kernel unit 12 processes the stream elements stored in the storage unit 11 based on the action requests stored in the request arbiter 13 in a round robin order.

Then, the $(P+1)^{th}$ one of the stream fetching units 2 fetches, based on the stream index information received by the receiver 21 thereof, from the storage unit 11 of the target one of the stream processing units 1, the stream element corresponding to the stream index information and processed by the kernel unit 12 of the target one of the stream processing units 1 through the scheduler 3.

Figure 2A:
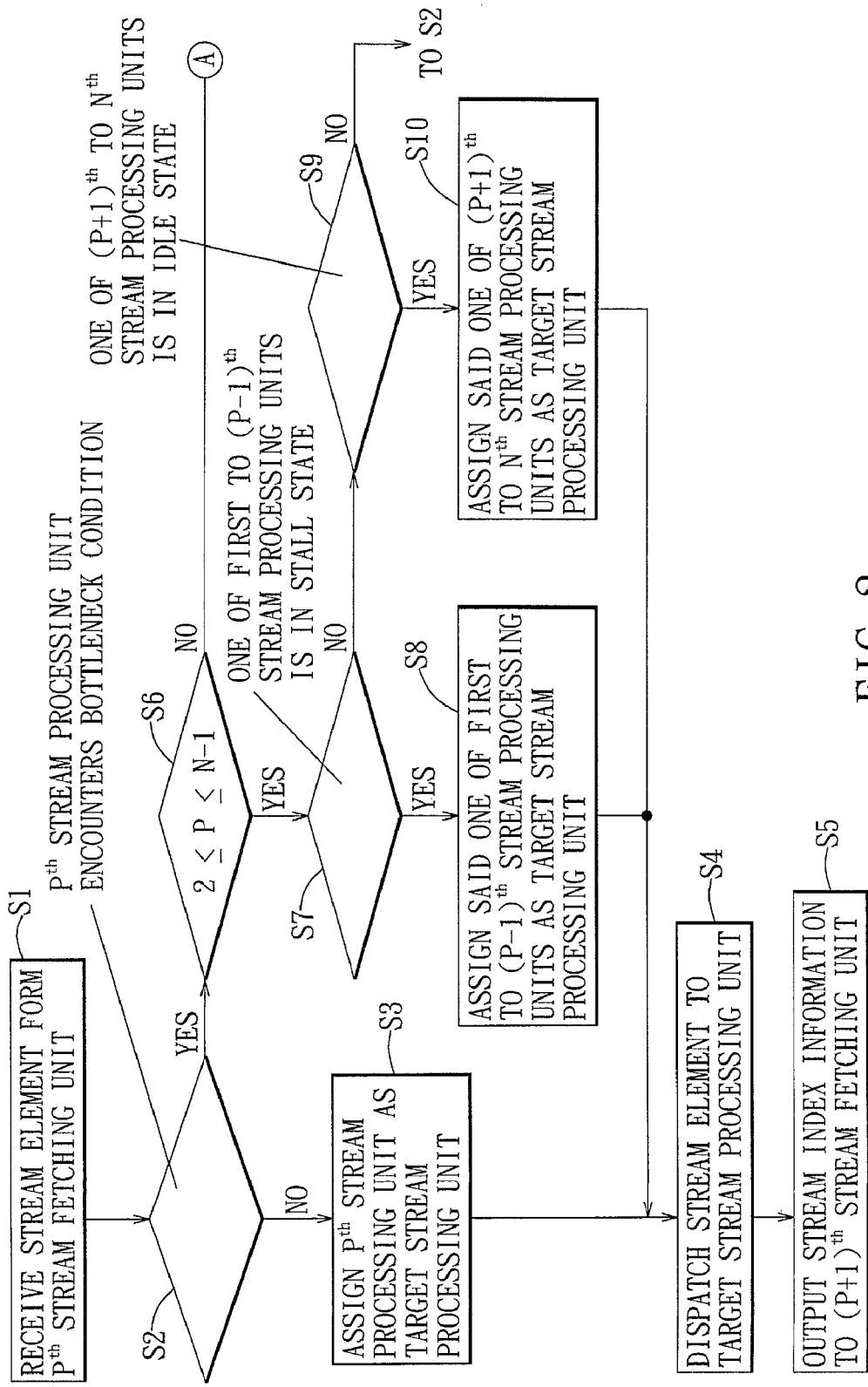
FIGS. 2a and 2b are flow charts illustrating a scheduling method performed by the multi-core stream processing system of the preferred embodiment.
Figure 2B:
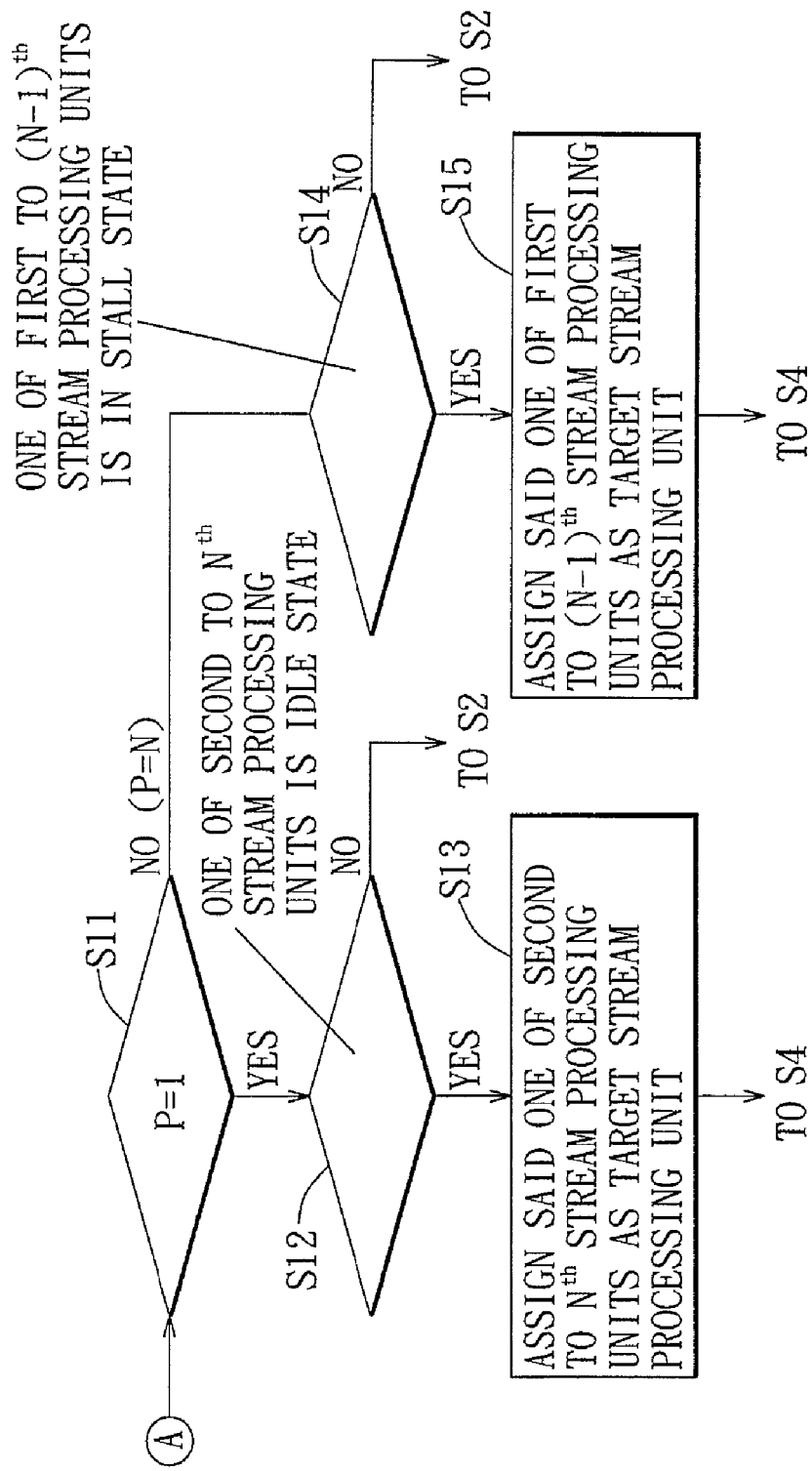

FIGS. 2a and 2b are flow charts illustrating a scheduling method performed by the multi-core stream processing system of the preferred embodiment.

In step S1, the scheduler 3 receives a stream element from a $P^{th}$ one of the stream fetching units 2, where $1 \leq P \leq N$. In step S2, the scheduler 3 determines whether a $P^{th}$ one of the stream processing units 1 encounters the bottleneck condition. If negative, the flow proceeds to step S3. Otherwise, the flow goes to step S6. In step S3, the scheduler 3 assigns the $P^{th}$ one of the stream processing units 1 as a target one of the stream processing units 1. In step S4, the scheduler 3 dispatches the stream element received in step S1 to the target one of the stream processing units 1 for stream processing. In step S5, the scheduler 3 outputs stream index information corresponding to the stream element received in step S1 to the $(P+1)^{th}$ one of the stream fetching units 2. In step S6, the scheduler determines whether P ranges from 2 to N−1. If affirmative, the flow goes to step S7. Otherwise, the flow goes to step S11. In step S7, the scheduler 3 determines whether one of first to $(P-1)^{th}$ ones of the stream processing units 1 is in the stall state. If affirmative, the flow goes to step S8. Otherwise, the flow goes to step S9. In step S8, the scheduler 3 assigns said one of the first to $(P-1)^{th}$ one of the stream processing units 1 determined in step S7 as the target one of the stream processing units 1, and the flow goes to step S4. In step S9, the scheduler 3 determines whether one of $(P+1)^{th}$ to $N^{th}$ ones of the stream processing units 1 is in the idle state. If affirmative, the flow goes to step S10. Otherwise, the flow goes back to step S2. In step S10, the scheduler 3 assigns said one of the $(P+1)^{th}$ to $N^{th}$ ones of the stream processing units 1 determined in step S9 as the target one of the stream processing units 1, and the flow goes to step S4. In step S11, the scheduler 3 determines whether P is equal to 1. If affirmative, the flow goes to step S12. Otherwise, i.e., P is equal to N, the flow goes to step S14. In step S12, the scheduler 3 determines whether one of the second to $N^{th}$ ones of the stream processing units 1 is in the idle state. If affirmative, the flow goes to step S13. Otherwise, the flow goes back to step S2. In step S13, the scheduler 3 assigns said one of the second to $N^{th}$ ones of the stream processing units 1 determined in step S12 as the target one of the stream processing units 1, and the flow goes to step S4. In step S14, the scheduler 3 determines whether one of the first to $(N-1)^{th}$ ones of the stream processing units 1 is in the stall state. If affirmative, the flow goes to step S15. Otherwise, the flow goes back to step S2. In step S15, the scheduler 3 assigns said one of the first to $(N-1)^{th}$ ones of the stream processing units 1 determined in step S14 as the target one of the stream processing units 1.

Figure 3:
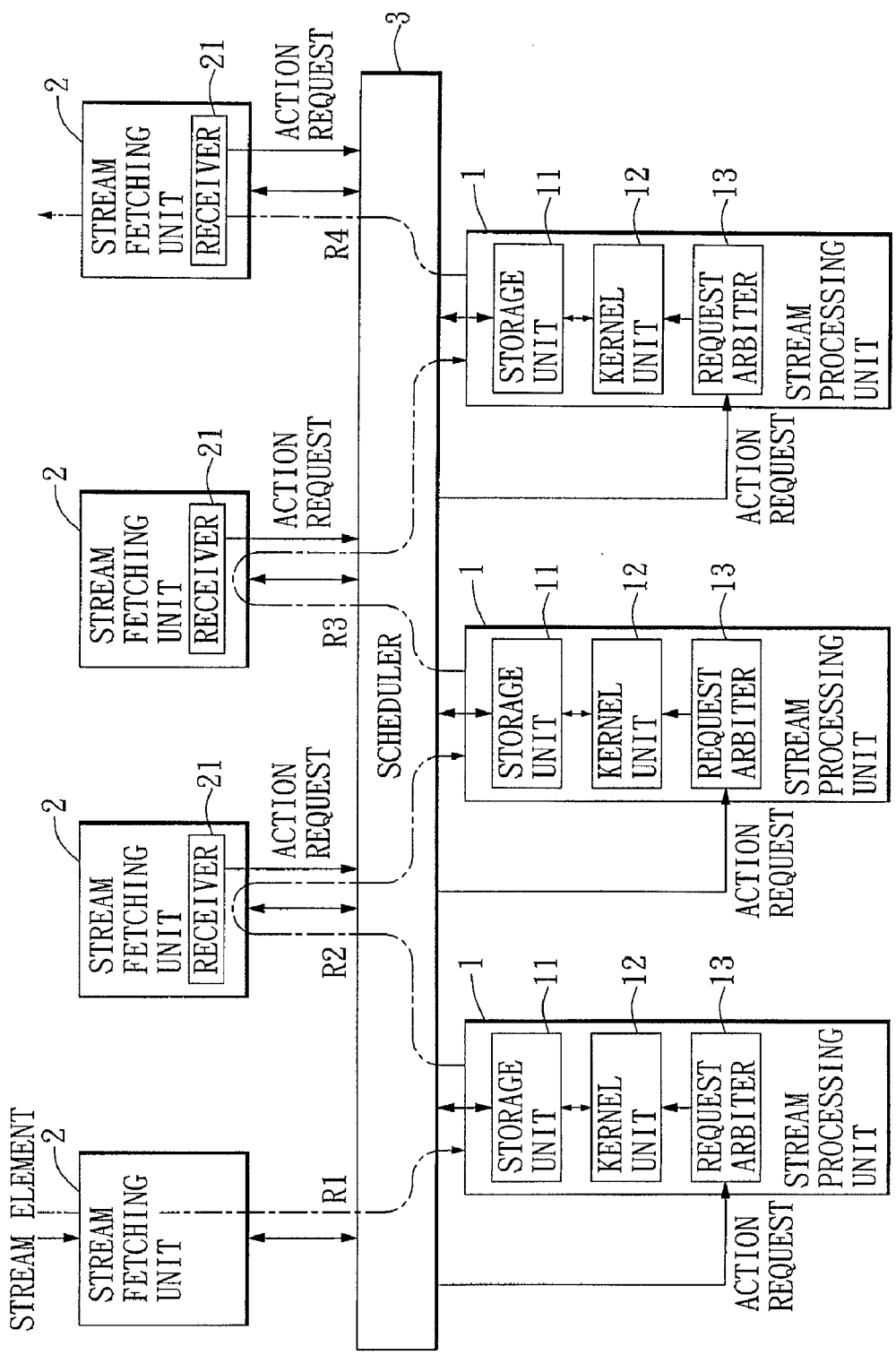
FIG. 3 is a schematic diagram illustrating the preferred embodiment operated in a case, where N=3 and none of three stream processing units of the preferred embodiment encounters a bottleneck condition.

FIG. 3 illustrates the multi-core stream processing system of the preferred embodiment operated in a case, where N=3 and none of the stream processing units 1 encounters the bottleneck condition. In this case, as indicated by the imaginary-line arrow (R1) in FIG. 3, the scheduler 3 receives a stream element fetched from the external device (not shown) from a first one of the stream fetching units 2, and dispatches the stream element received thereby to a first one of the stream processing units 1 for stream processing. Then, as indicated by the imaginary-line arrow (R2) in FIG. 3, a second one of the stream fetching units 2 fetches, from the first one of the stream processing units 1, the stream element processed by the first one of the stream processing units 1 through the scheduler 3 and sends the same to a second one of the stream processing units 1 through the scheduler 3 for stream processing. Thereafter, as indicated by the imaginary-line arrow (R3) in FIG. 3, a third one of the stream fetching units 2 fetches, from the second one of the stream processing units 1, the stream element processed by the second one of the stream processing units 1 and sends the same to a third one of the stream processing units 1 through the scheduler 3 for stream processing. Finally, as indicated by the imaginary-line arrow (R4) in FIG. 3, a fourth one of the stream fetching units 2 fetches, from the third one of the stream processing units 1, the stream element processed by the third one of the stream processing units 1 through the scheduler 3 and sends the same to the outside.

Figure 4:
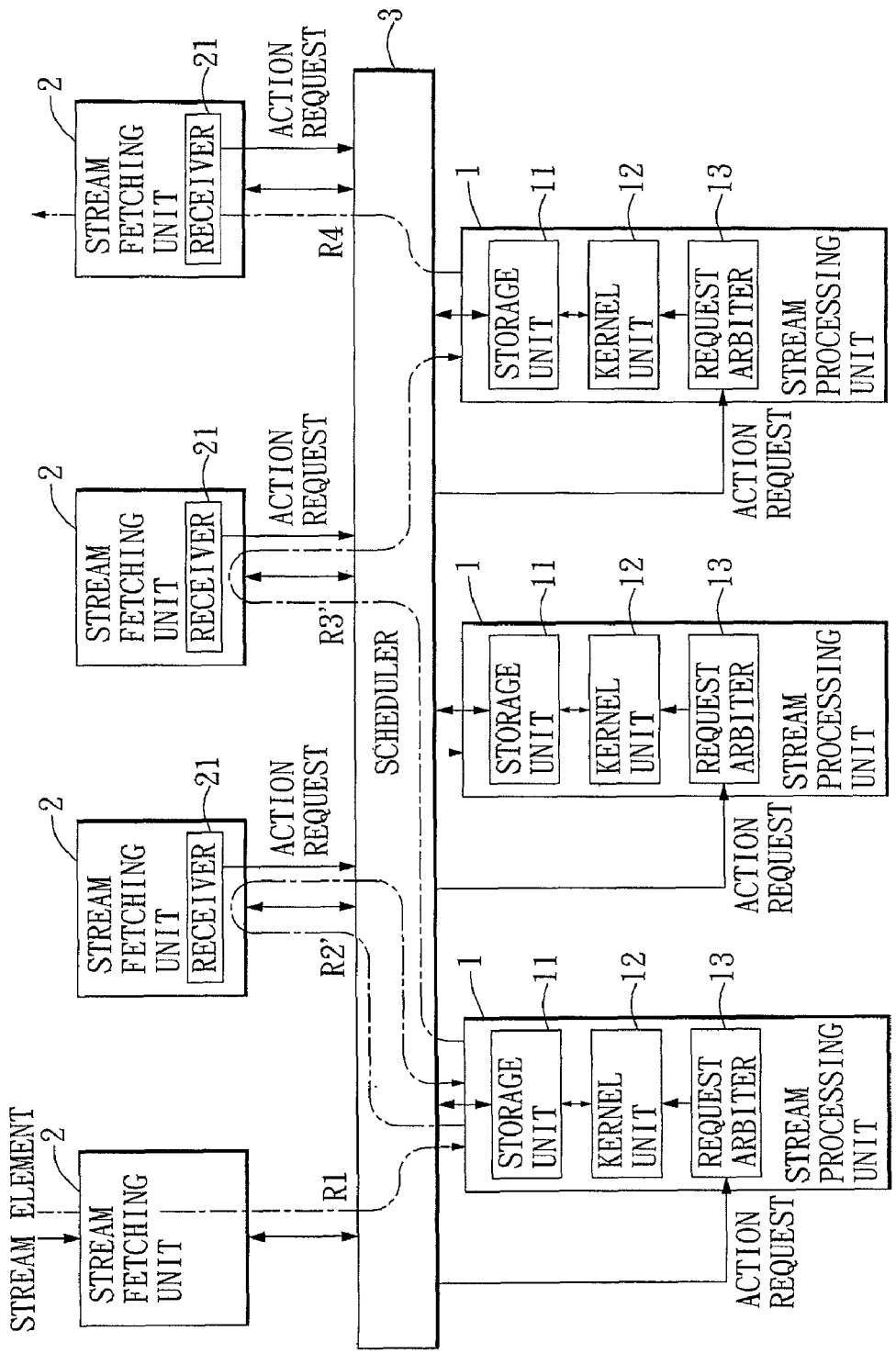
FIG. 4 is a schematic diagram illustrating the preferred embodiment when operated in another case, where N=3 and a second one of the three stream processing units of the preferred embodiment encounters the bottleneck condition.

However, if the second one of the stream processing units 1 encounters the bottleneck condition, the stream element processed by the first one of the stream processing units 1 cannot be dispatched to the second one of the stream processing units 1 such that the first one of the stream processing units 1 is in the stall state. In this case, as indicated by the imaginary-line arrow (R2') in FIG. 4, the scheduler 3 receives from the second one of the stream fetching units 2 the stream element processed by the first one of the stream processing units 1, and dispatches the stream element received thereby to the first one of the stream processing units 1 for stream processing. Then, as indicated by the imaginary-line arrow (R3') in FIG. 4, the third one of the stream fetching units 2 fetches, from the first one of the stream processing units 1, the stream element processed by the first one of the stream processing units 1 and sends the same to the third one of the stream processing units 1 through the scheduler 3. As a result, the utilization rate of the first one of the stream processing units 1 is enhanced, thereby enhancing overall performance of the multi-core stream processing system.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A multi-core stream processing system comprising:
   a number (N) of stream processing units, where $N \geq 2$;
   a number (N+1) of stream fetching units, a first one of which is adapted to fetch a stream element from an external device; and
   a scheduler coupled to said stream processing units and said stream fetching units, and controlling second to $(N+1)^{th}$ ones of said stream fetching units so that each of the second to $(N+1)^{th}$ ones of said stream fetching units fetches a stream element from a source one of said stream processing units;
   wherein, when said scheduler receives the stream element from a $P^{th}$ one of said stream fetching units, said scheduler
   determines whether a $P^{th}$ one of said stream processing units encounters a bottleneck condition,
   assigns the $P^{th}$ one of said stream processing units as a target one of said stream processing units when the $P^{th}$ one of said stream processing units does not encounter the bottleneck condition,
   finds a $Q^{th}$ one of said stream processing units that does not encounter the bottleneck condition, and assigns the $Q^{th}$ one of said stream processing units as the target one of said stream processing units when the $P^{th}$ one of said stream processing units encounters the bottleneck condition, where $1 \leq P \leq N$, $1 \leq Q \leq N$, and $P \neq Q$, and
   dispatches the stream element received thereby to the target one of said stream processing units such that the target one of said stream processing units processes the stream element dispatched from said scheduler.

2. The multi-core stream processing system as claimed in claim 1, wherein the $Q^{th}$ one of said stream processing units is in one of a stall state and an idle state.

3. The multi-core stream processing system as claimed in claim 2, wherein:
   when P=1, the $Q^{th}$ one of said stream processing units is in the idle state, where $2 \leq Q \leq N$;
   when $2 \leq P \leq N-1$, the $Q^{th}$ one of said stream processing units is in the stall state, where $1 \leq Q \leq P-1$, and is in the idle state, where $P+1 \leq Q \leq N$, in case first to $(P-1)^{th}$ ones of said stream processing units are not in the stall state; and
   when P=N, the $Q^{th}$ one of said stream processing units is in the stall state, where $1 \leq Q \leq N-1$.

4. The multi-core stream processing system as claimed in claim 1, wherein each of said stream processing units includes:
   a storage unit coupled to said scheduler and storing at least one stream element dispatched from said scheduler; and
   a kernel unit coupled to said storage unit, operable to process in sequence the at least one stream element stored in said storage unit, and updating the at least one stream element stored in said storage unit with the at least one stream element processed thereby.

5. The multi-core stream processing system as claimed in claim 4, wherein the bottleneck condition for each of said stream processing units indicates that an amount of data stored in said storage unit thereof is greater than a threshold amount.

6. The multi-core stream processing system as claimed in claim 4, wherein the stream element fetched by each of said stream fetching units includes stream data and a stream index.

7. The multi-core stream processing system as claimed in claim 6, wherein:
   said scheduler further outputs stream index information corresponding to the stream element received from the $P^{th}$ one of said stream fetching units to a $(P+1)^{th}$ one of said stream fetching units; and
   each of the second to $(N+1)^{th}$ ones of said stream fetching units includes a receiver coupled to said scheduler for receiving the stream index information therefrom.

8. The multi-core stream processing system as claimed in claim 7, wherein the stream index information includes target information associated with said kernel unit of the target one of said stream processing units, and the stream index of the stream element received by said scheduler and associated with a starting storage address in said storage unit of the target one of said stream processing units.

9. The multi-core stream processing system as claimed in claim 8, wherein said receiver of the $(P+1)^{th}$ one of said stream fetching units issues an action request corresponding to the stream index information received thereby to the target one of said stream processing units through said scheduler upon receipt of the stream index information from said scheduler.

10. The multi-core stream processing system as claimed in claim 9, wherein each of said stream processing units further includes a request arbiter coupled to said kernel unit thereof and said scheduler, receiving at least one action request from said stream fetching units through said scheduler and storing the at least one action request therein, said kernel unit of the target one of said stream processing units processing the at least one stream element stored in said storage unit of the target one of said stream processing units in response to the at least one action request received by said request arbiter.

11. The multi-core stream processing system as claimed in claim 10, wherein, for the target one of said stream processing units, when said storage unit thereof is stored with a plurality of the stream elements and said request arbiter thereof is stored with a plurality of the action requests corresponding to the stream elements stored in said storage unit, said kernel unit thereof processes the stream elements stored in said storage unit based on the action requests stored in said request arbiter in a round robin order.

12. The multi-core stream processing system as claimed in claim 9, wherein the $(P+1)^{th}$ one of said stream fetching units fetches, based on the stream index information received by said receiver thereof, from said storage unit of the target one of said stream processing units, the stream element corresponding to the stream index information and processed by said kernel unit of said target one of said stream processing units through said scheduler.

13. A scheduling method for a multi-core stream processing system that includes a number (N) of stream processing units and a number (N+1) of stream fetching units, where $N \geq 2$, said scheduling method comprising the steps of:
   a) receiving a stream element from a $P^{th}$ one of the stream fetching units, where $1 \leq P \leq N$;
   b) determining whether a $P^{th}$ one of the stream processing units encounters a bottleneck condition;
   c) assigning the $P^{th}$ one of the stream processing units as a target one of the stream processing units when it is determined in step b) that the $P^{th}$ one of the stream processing units does not encounter the bottleneck condition;
   d) finding a $Q^{th}$ one of the stream processing units that does not encounter the bottleneck condition, and assigning the $Q^{th}$ one of the stream processing units as the target one of the stream processing units when it is determined in step b) that the $P^{th}$ one of the stream processing units encounters the bottleneck condition, where $1 \leq Q \leq N$ and $P \neq Q$; and
   e) dispatching the stream element received in step a) to the target one of the stream processing units for processing.

14. The scheduling method as claimed in claim 13, wherein the $Q^{th}$ one of the stream processing units is in one of a stall state and an idle state.

15. The scheduling method as claimed in claim 14, wherein the $Q^{th}$ one of the stream processing units is in the idle state when P=1, where $2 \leq Q \leq N$.

16. The scheduling method as claimed in claim 14, wherein the $Q^{th}$ one of the stream processing units is in the stall state when P=N, where $1 \leq Q \leq N-1$.

17. The scheduling method as claimed in claim 14, wherein, when $2 \leq P \leq N-1$, step d) further includes the substeps of:
   d-1) determining whether one of first to $(P-1)^{th}$ ones of the stream processing units is in the stall state;
   d-2) assigning said one of the first to $(P-1)^{th}$ ones of the stream processing units as the $Q^{th}$ one of said stream processing units when it is determined in sub-step d-1) that said one of the first to $(P-1)^{th}$ of the stream processing units is in the stall state;
   d-3) determining whether one of $(P+1)^{th}$ to $N^{th}$ ones of the stream processing units is in the idle state when it is determined in sub-step d-1) that none of the first to $(P-1)^{th}$ ones of the stream processing units is in the stall state; and
   d-4) assigning said one of the $(P+1)^{th}$ to $N^{th}$ ones of the stream processing units as the $Q^{th}$ one of said stream processing units when it is determined in sub-step d-3) that said one of the $(P+1)^{th}$ to $N^{th}$ ones of the stream processing units is in the idle state.

18. The scheduling method as claimed in claim 13, wherein, in step b), the bottleneck condition indicates that an amount of data to be processed by the $P^{th}$ one of the stream processing units is greater than a threshold amount.

19. The scheduling method as claimed in claim 13, wherein the stream element received in step a) includes stream data and a stream index.

20. The scheduling method as claimed in claim 19, further comprising the step of:
   f) outputting stream index information corresponding to the stream element received in step a) to a $(P+1)^{th}$ one of the stream fetching units.

21. The scheduling method as claimed in claim 20, each of the stream processing units including a storage unit, wherein:
   the stream element dispatched in step e) is stored in the storage unit of the target one of the stream processing units; and
   the stream index information outputted in step f) includes target information associated with the target one of said stream processing units, and the stream index of the stream element received in step a) and associated with a starting storage address in the storage unit of the target one of the stream processing units.

* * * * *